United States Patent
Zhan et al.

(10) Patent No.: US 8,406,494 B2
(45) Date of Patent: Mar. 26, 2013

(54) ANATOMICAL PRIMITIVE DETECTION

(75) Inventors: Yiqiang Zhan, Berwyn, PA (US); Maneesh Dewan, West Chester, PA (US); Zhigang Peng, Blue Bell, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 908 days.

(21) Appl. No.: 12/507,991

(22) Filed: Jul. 23, 2009

(65) Prior Publication Data

US 2010/0034440 A1  Feb. 11, 2010

Related U.S. Application Data

(60) Provisional application No. 61/087,422, filed on Aug. 8, 2008, provisional application No. 61/101,794, filed on Oct. 1, 2008.

(51) Int. Cl.
*G06K 9/00* (2006.01)
*G06K 9/32* (2006.01)

(52) U.S. Cl. .......................... 382/128; 382/154; 382/194

(58) Field of Classification Search .......... 382/128–134, 382/154, 218, 275, 294–296, 305, 312; 345/629, 345/651, 36; 600/447; 250/492.2
See application file for complete search history.

(56) References Cited

U.S. PATENT DOCUMENTS

| | | | | |
|---|---|---|---|---|
| 5,828,769 A * | 10/1998 | Burns | ............................ | 382/118 |
| 7,920,730 B2 * | 4/2011 | Jerebko | .......................... | 382/128 |
| 7,974,456 B2 * | 7/2011 | Lee et al. | ...................... | 382/133 |
| 7,978,932 B2 * | 7/2011 | Vercauteren et al. | .......... | 382/284 |
| 8,180,167 B2 * | 5/2012 | Bhattacharjya et al. | ....... | 382/254 |
| 2003/0190091 A1 * | 10/2003 | Stewart et al. | ................ | 382/294 |
| 2004/0165767 A1 * | 8/2004 | Gokturk et al. | ................ | 382/159 |
| 2006/0045347 A1 * | 3/2006 | Xiao et al. | ...................... | 382/190 |
| 2006/0165268 A1 * | 7/2006 | Kaus et al. | ..................... | 382/128 |
| 2007/0081713 A1 * | 4/2007 | Jerebko | ........................ | 382/128 |
| 2009/0010509 A1 * | 1/2009 | Zhou et al. | ..................... | 382/128 |
| 2010/0008643 A1 * | 1/2010 | Rakib et al. | ..................... | 386/68 |
| 2010/0014768 A1 * | 1/2010 | Bhattacharjya et al. | ....... | 382/254 |

OTHER PUBLICATIONS

M. Syn, R.W. Prager, Mesh models for three-dimensional ultrasound imaging, Technical Report CUED/F- INFENG/TR210Cambridge University Engineering Department, Sophia-Antipolis (Dec. 1994).*
M Dewan, Y Zhan, Z Peng, XS Zhou. Robust Algorithms for Anatomic Plane Primitive Detection in MR. In Proceedings of SPIE Medical Imaging, Feb. 2009.*
Feddema, J.T.; Little, C.Q.; , "Rapid world modeling: fitting range data to geometric primitives," Robotics and Automation, 1997. Proceedings., 1997 IEEE International Conference on , vol. 4, No., pp. 2807-2812 vol. 4, Apr. 20-25, 1997.*

(Continued)

*Primary Examiner* — Andrae S Allison
(74) *Attorney, Agent, or Firm* — Peter Withstandley

(57) ABSTRACT

A method of detecting an anatomical primitive in an image volume includes detecting a plurality of transformationally invariant points (TIPS) in the volume, aligning the volume using the TIPs, detecting a plurality landmark points in the aligned volume that are indicative of a given anatomical object, and fitting a target geometric primitive as the anatomical primitive based using the detected landmark points.

22 Claims, 5 Drawing Sheets

OTHER PUBLICATIONS

Yoo et al, Anatomic Modeling from Unstructured Samples Using Variational Implicit Surfaces, Proceeding SIGGRAPH '05 ACM SIGGRAPH 2005 Courses Article No. 245, ACM New York, NY, USA 2005.*

Liu, Y., et al, "Robust midsagittal plane extraction from normal and pathological 3d neuroradiology images", IEEE Transactions on Medical Imaging 20, 175-192 (Mar. 2001).

Prima, S., "Computation of the mid-sagittal plane in 3d brain images," IEEE Transaction on Medical Imaging 21, 122-138 (2002).

Viola, P., et al., "Rapid object detection using a boosted cascade of simple features," Proc. IEEE Conf. on Computer Visiona and Pattern Recognition 1, 511-518 (2001).

Peng, Z., et al., "Robust anatomy detection ct togograms," Submitted to SPIE 2009.

Fischler, M., et al., "Random sample consensus: A paradigm for model fitting with application to image analysis and automated cartography," Communications of the ACM 24(6), 2381-395 (1981).

* cited by examiner

ANATOMICAL PRIMITIVE DETECTION

CROSS-REFERENCE TO RELATED APPLICATIONS

This application claims priority to U.S. Provisional Application No. 61/087,422, filed on Aug. 8, 2008 and U.S. Provisional Application No. 61/101,794, filed on Oct. 1, 2008, wherein the disclosure of each are incorporated by reference herein.

BACKGROUND OF THE INVENTION

1. Technical Field

The present disclosure relates to anatomy detection and, more specifically, to a system and method for transformation invariant landmark detection for anatomical primitives.

2. Discussion of Related Art

Anatomical primitives such as points, planes, and regions of interest can be an integral part of medical imaging analysis algorithms, such as tracking, registration, segmentation, detection, and recognition. In many conventional detection approaches, these primitives are manually detected and labeled. However, these approaches are not generic, as they focus towards a particular plane and cannot adapt to handle abnormal, irregular and/or partial images. Further, these approaches may not work well on real-world data. For example, the variability across patients can be quite large, where many seemingly plausible heuristics would fail. Additionally, diseases or artifacts can alter/fade out a particular anatomy. Furthermore, a partial field of view can lead to partial data problems.

Thus, there is a need for a detection system and method that is robust and generic to different variations, adaptable to different applications/problems and automatic to save time and improve consistency/repeatability, for example, in follow-up studies of the same patient or a cross-patient comparison.

SUMMARY OF THE INVENTION

According to an exemplary embodiment of the present invention, a method of detecting an anatomical primitive in an image volume includes detecting a plurality of transformationally invariant points (TIPs) in the volume, aligning the volume using the TIPs, detecting a plurality landmark points in the aligned volume that are indicative of a given anatomical object, and fitting a target geometric primitive as the anatomical primitive using the detected points.

The TIPs may be rotationally invariant points. The aligning may include aligning the volume based on the TIPs and annotated points (e.g., points of known location and identities) within a model patient volume. Prior to fitting of the geometric primitive, consensus voting may be performed on the detected landmark points to discard those some the previously detected ones deemed erroneous.

The fitting of the target geometric primitive may include, for a predetermined plurality of tries, randomly sampling points of the landmark points (or those that remain if the consensus voting was performed) to fit a geometric primitive using a least squares method, refining the geometric primitive and generating a corresponding error using an iteratively re-weighted least squares (IRLS) method, and selecting one of the refined geometric primitives as the anatomical primitive based on the corresponding errors.

A set or subset of the steps before the fitting (e.g., detecting of TIPs, aligning of the volume, detecting of landmark points, and performing consensus voting) may be iteratively performed for a predetermined number of times. The random sampling may include sampling a minimum number of the remaining landmark points needed to fit the geometric primitive. The selecting of the refined geometric primitive may include selecting the refined primitive that has a lowest error if its number of inlier points is greater than a predefined percentage times the number of remaining landmark points and the lowest error. The predefined percentage may indicate a probability that the remaining landmark points are the inlier points. The number of inlier points may corresponds to the positive weights generated by the IRLS method computing weights of the geometric primitive using an M-estimator method. The IRLS method may include performing a re-weighted least squares method until the error increases.

The geometric primitive may be is one of a point, a curve (e.g., a line), a surface (e.g., a plane), or a three-dimensional region. When the geometric primitive is a plane, the randomly sampling step may include: selecting a reference point from the remaining landmark points, randomly sampling three non-neighbor landmark points relative to the reference point, and fitting a plane through the sampled points using the least squares method. Further, when the geometric primitive is a plane, the step of refining the geometric primitive may include: computing weights for the plane using an M-estimator method, refining the plane using the computed weights, and computing the error from the refined plane. The refining plane of the plane may include fitting the plane using a least squares method and the computed weights.

The discarding of the landmark points that were erroneously detected using consensus voting may include: dividing combinations of the landmark points into voting groups, voting by each of the voting groups on landmark points of the other groups based on the degree to which features of the voting group match features of the landmark point voted upon, and discarding the landmark points that have a number of votes below a predetermined voting threshold value.

The model patient volume may include annotated landmark points of known locations and the aligning of the volume may then includes aligning the TIPs to the corresponding annotated landmark points. The volume may be a computed tomography image or a magnetic resonance image.

According to an exemplary embodiment of the present invention, a method of detecting an anatomical primitive in an image volume includes: detecting a plurality of transformationally invariant landmark points in the image volume that are indicative of a given anatomical object and fitting a target geometric primitive as the anatomical primitive using the detected landmark points. When the geometric primitive is a plane, the fitting may include, for a predefined plurality of tries, randomly sampling three of the landmark points and generating a corresponding plane from the sampled points using a least squares method, using an iteratively re-weighted least squares (IRLS) method to refine the plane and generate a corresponding error, and selecting one of the refined planes as the detected anatomical primitive based on the errors.

The selecting of the refined plane may include selecting the one having a lowest error if a number of its inlier points are greater than a predefined percentage times the number of landmark points. Using the IRLS method may include computing weights for the plane using an M-estimator method, generating the refined plane using the computed weights, and computing the error from the refined plane. The generating of the refined plane may include fitting the plane using a least squares method and the computed weights.

An exemplary embodiment of the present invention includes a computer system comprising a processor and a program storage device readable by the computer system, embodying a program of instructions executable by the processor to perform method steps for detecting an anatomical primitive in an image volume. The method includes detecting a plurality of transformationally invariant points (TIPs) in the volume, aligning the volume using the TIPs, detecting a plurality landmark points in the aligned volume that are indicative of a given anatomical object, for a predefined plurality of tries, randomly sampling points of the remaining landmark points to fit a geometric primitive using a least squares method and using an iteratively re-weighted least squares (IRLS) method to refine the geometric primitive and generating a corresponding error, and selecting one of the refined geometric primitives as the anatomical primitive based on the corresponding errors.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF EXEMPLARY EMBODIMENTS

Figure 1:
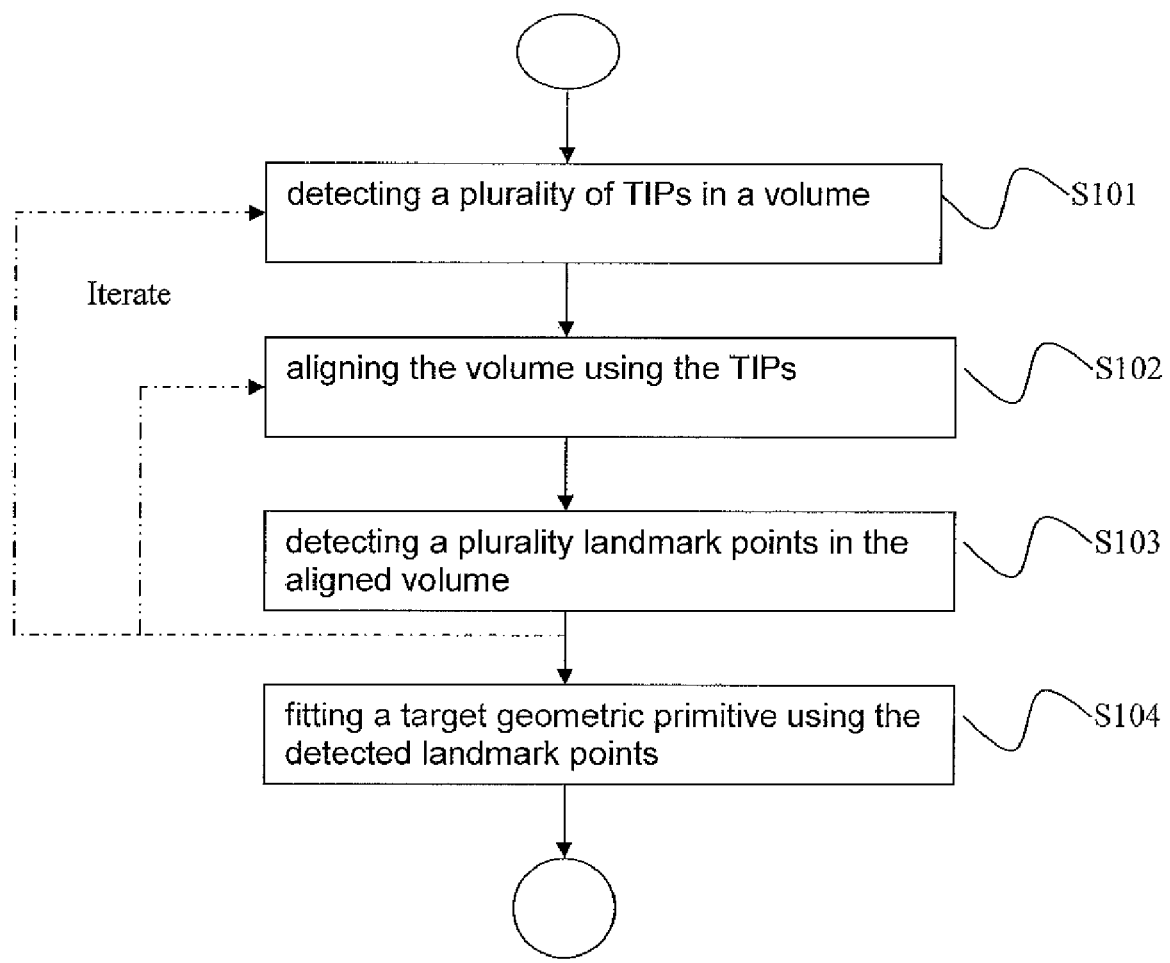
FIG. 1 illustrates a high-level flow chart of a method of detecting anatomical primitives, according to an exemplary embodiment of the present invention.

In describing exemplary embodiments of the present disclosure illustrated in the drawings, specific terminology is employed for sake of clarity. However, the present disclosure is not limited to the specific terminology selected, and it is to be understood that each specific element includes all technical equivalents which operate in a similar manner. It is to be understood that the systems and methods described herein may be implemented in various forms of hardware, software, firmware, special purpose processors, or a combination thereof.

In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Exemplary embodiments of present invention seek to provide an approach for automatically detecting anatomical primitives within a given image volume. The detected primitives include a number of landmark points, which can be used to determine a region of interest (ROI), such as a point, a curve (e.g., a line), a surface (e.g., a plane), a 3D section, etc. For example, at least three landmark points are required to form a plane.

FIG. 1 illustrates a method of detecting an anatomical primitive in an image volume according to an exemplary embodiment of the present invention. Referring to FIG. 1, the method includes detecting a plurality of transformationally invariant points (TIPs) in a volume (S101), aligning the volume with using the TIPs (S102), detecting a plurality of landmark points in the aligned volume (S103), and fitting a target geometric primitive as the anatomical primitive using the detected landmark points (S104).

The method will be described in more detail below. The TIPs may be rotationally invariant points (RIPs), which are points that are robust in the presence of rotation, e.g., the eyeball centers in MR (magnetic resonance) head scout scans. The TIPs may instead be invariant with respect to scale. A minimum number of TIPs that are needed to perform a rigid alignment in the appropriate dimension are detected. For example, in two dimensions, generally at least two points are needed, while in three dimensions, generally at least three points are needed. For a more robust alignment, more TIP points are detected in addition to the minimum. However, due to occlusion or cropping, some of the detected TIPs may be errors. The detected TIPs may be ordered in a list based on their quality, and a subset of the best quality TIPs may then be used for the alignment.

The alignment (block S102) may include aligning the current volume (e.g., a volume of the head) with a model patient (e.g., a model patient volume), which includes pre-annotated landmarks. For example, the locations and identities of the landmarks in the model patient volume may have been pre-marked by a skilled health care profession and are thus known. While the model patient volume is typically not rotated, it may contain a known rotation. The alignment may be performed by matching up TIPs against corresponding known landmarks in the model patient volume.

Detecting the landmark points (block S103) in the aligned image includes detecting local feature candidates that are representative of potential anatomical landmarks (e.g., tip of lungs). The points in the aligned volume are considered Transformationally Aligned Points (TAPS). The local feature candidates may be automatically detected from the aligned volume by identifying regions in the volume that appear to be known anatomical landmarks. The search may begin around an estimated position from the model within a local patch, and then to a larger region. The set of local feature candidates may include multiple local feature candidates that appear to be the same anatomical landmark.

The detection of the TIPs and the landmark points may be performed using a learning based algorithm. In an exemplary embodiment of the present invention, the points are detected in a coarse-to-fine manner. For example, in a course-to-fine detection, large blocks (e.g., those of a coarse level) of an image are first examined against a few pertinent features to isolate a corresponding block of interest. Sub-blocks (e.g., finer than the large blocks) of the isolated block of interest can then be examined against several more pertinent features. The process can then be repeated on the sub-blocks until a desired level of quality is reached.

As shown by the optional dotted lines in FIG. 1, the methods of blocks 101-103 may be iteratively performed for a predetermined number of times to refine the detected landmark points. Alternately, the methods of blocks 102-103 may be may be iteratively performed for a predetermined number of times to refine the detected landmark points (e.g., block 101 of detecting the TIPs may be skipped in the iteration). In an alternate embodiment of the present invention, the methods of blocks 102 and 103 are omitted and the fitting of block 104 is performed on the detected plurality of TIPs. In another alternate embodiment of the present invention, the methods of blocks 101 and 102 are omitted, and block 103 detects landmark points in the volume.

Figure 2:
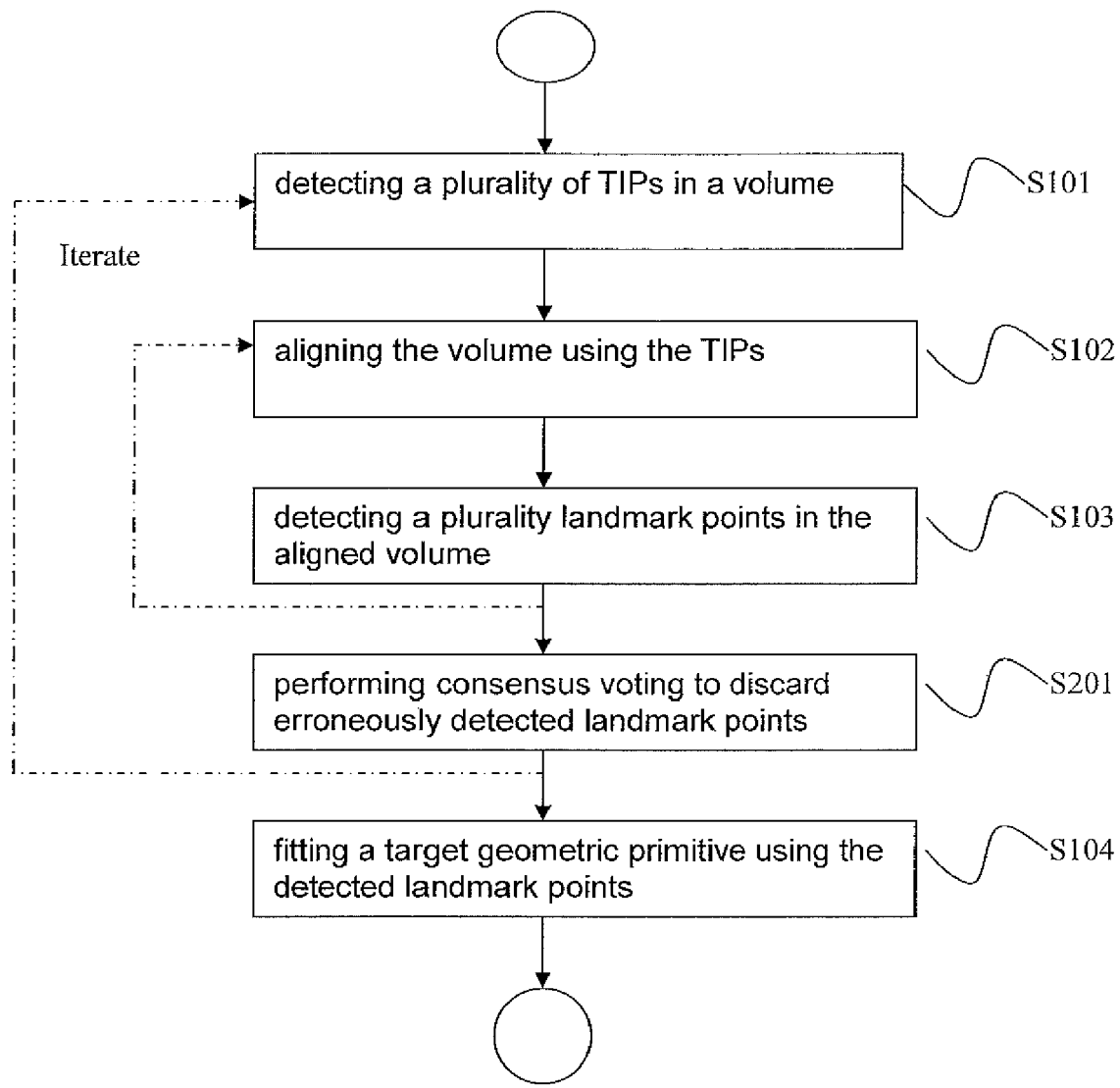
FIG. 2 illustrates a variant of the method of FIG. 1, according to an exemplary embodiment of the present invention.

FIG. 2 illustrates a variant of the method FIG. 1, which performs consensus voting on the detected landmark points to discard those it deems to have been erroneously detected (S201). The method of block 201 is performed after block 103 and before block 104. Similar to FIG. 1, steps before block 104 in FIG. 2 may be iteratively performed a predetermined number of times to refine the resulting landmark points. For example, the optional dotted lines in FIG. 2 show that blocks S101-S103, and S201 or blocks S101-S102 may be iteratively performed the predetermined number of times.

The consensus voting is applied to the local feature candidates (block 201) to remove local feature candidates that were erroneously detected. Each landmark is considered a candidate for the most reliable feature set. The quality of a candidate is voted upon by voting groups formed by other landmarks.

Each landmark may participate as an individual voter and may also form voting groups with other landmarks. Ideally, if a candidate is good, it receives a "YES" from good voting groups", and a "NO" from bad voters. However, it is possible that a group of erroneous landmarks happens to form a legitimate constellation. In this example, if a landmark is erroneous, it receives a high vote from some bad voters in the legitimate constellation.

A voting group may include only two other landmarks. Alternatively, each voting group may include a large number of landmarks. It is to be understood that the voting groups may be made up of any number of other landmarks, and it may also be possible to utilize voting groups of dissimilar size.

In one voting strategy, erroneous detections are "peeled away" in a sequential fashion. Each candidate receives a set of votes from other candidates. The strategy then iteratively removes the worse candidate (e.g., the candidate whose maximum vote is a minimum across all the remaining candidates). This is repeated until the number of the remaining candidates reaches a pre-set value M as part of a min-max removal strategy. Assuming at least M good candidates, all the bad candidates can be removed. Exemplary pseudocode for implementing the min-max removal strategy is provided below in Table 1:

TABLE 1 for each candidate $x_i$ do
   Sort all the votes received by landmark $x_i$
end for
repeat
   $\check{x}$ = arg max$_{Xi}$ max $\gamma_{Xi}$
   Remove $\check{x}$ and all votes involved with $\check{x}$
Until Only M candidates are left where the sorted array is defined by $\gamma_{Xi}$.

While the above min-max strategy works well in many cases, different strategies may be employed for different behaviors, for example, when mafia-like behavior is exhibited among erroneous detections. According to a Mafia model, a collection of candidates/voters that are in truth bad, tend to give high votes to other members of the same collection. In this way, erroneous detections or bad voters may increase the likelihood that other bad voters are included. This may happen, for example, when a set of erroneous landmarks form a legitimate constellation.

Figure 3:
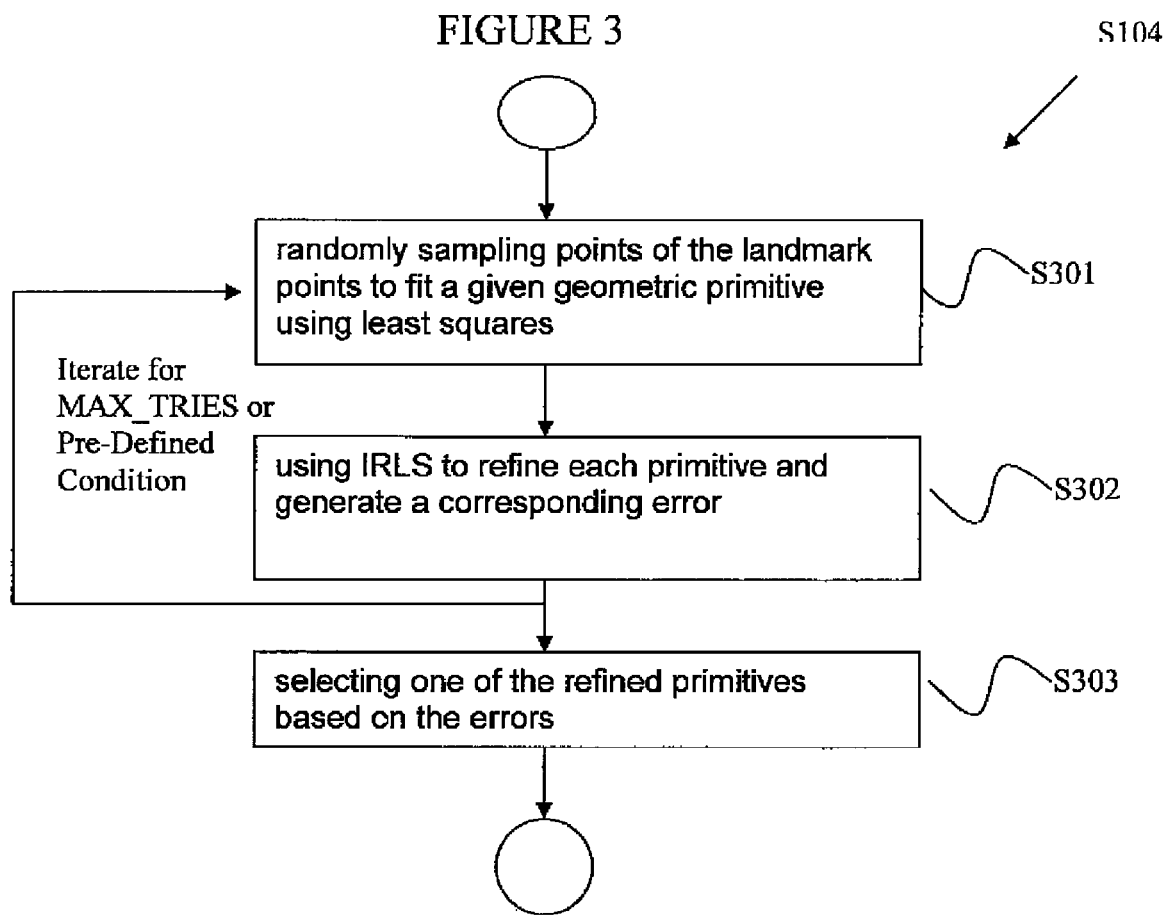
FIG. 3 illustrates a high-level flow chart of a method for fitting a target geometric primitive according to FIG. 1 and FIG. 2, according to an exemplary embodiment of the present invention.
Figure 4:
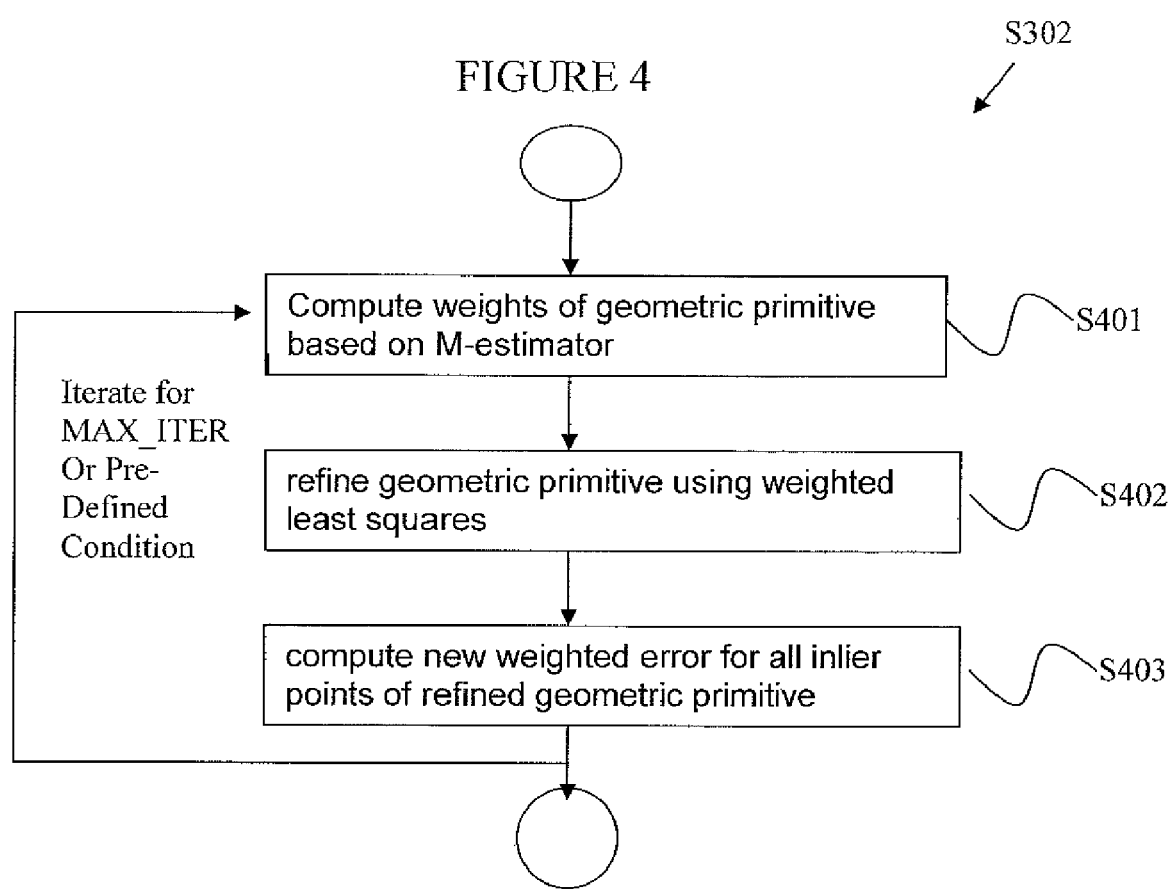
FIG. 4 illustrates a high-level flow chart of a method for refining a target geometric primitive and generating a corresponding error according to FIG. 3, according to an exemplary embodiment of the present invention.

Block 104 can use the resulting landmarks from block 103 or 201 to generate an anatomic primitive. FIG. 3 and FIG. 4 illustrate an exemplary embodiment of block 104, which combines use of a random sampling-based approach (RANSAC) and a robust regression approach (e.g., M-estimation with iteratively re-weighted least squares (IRLS).

The following applies FIG. 3 and FIG. 4 to generate a plane $n^T x = d$ as the geometric primitive, where n is the normal to the plane, d is the distance to the plane, and x is the point on the plane. Referring to FIG. 3, a random sampling of the minimum number of points needed to fit a desired geometric primitive using least squares is performed (S301). For example, since a plane is used here, three (3) non-neighbor points (e.g., relative to a sampled region) are sampled from the landmark points resulting from either the detection of block 103 or the consensus voting of block 104. A plane $n_i, d_i$ is then fitted through the sampled points using the least squares method. The best fit in the least-squares sense is that instance of the model for which the sum of squared residuals has its least value, a residual being the difference between an observed value and the value given by the model.

Once the geometric primitive (e.g., the plane) has been fitted through the sampled points, an iteratively re-weighted least squares (IRLS) method may be performed to refine the primitive (e.g., the plane) and generate a corresponding error (S302).

FIG. 4 illustrates an exemplary embodiment of the block 302, which may be used to refine the primitives (e.g., planes) and generate the corresponding errors. Referring to FIG. 4, weights of the fitted geometric primitive (e.g., the plane) are computed based on an M-estimator (S401), a refined geometric primitive is generated using weighted least squares (S402), and a new weighted error is generated for all inlier points of the refined primitive (e.g., the refined plane) (S403). The points of the refined plane with positive weights are considered the inliers. Blocks 401-403 may be performed iteratively for several tries MAX_ITER (e.g., 10) or until a predefined condition is reached. For example, in one embodiment of the present invention, the iteration terminates if the new weighted error increases.

Blocks 301-302 may be applied iteratively for several tries MAX_TRIES on different sample points (e.g., three for a plane) to generate additional refined geometric primitives (e.g., planes) and corresponding errors or until a predetermined condition is reached. The parameter MAX_TRIES is an integer, which may be arbitrarily predefined to a set value (e.g., 10, 100, etc.) or determined empirically based on characteristics of the primitive that is to be detected. One of the refined primitives (e.g., planes) can then be selected based on the corresponding errors as the final anatomical primitive (S303). For example, the refined primitive (e.g., plane) with the lowest error may be selected. The parameter MAX_TRIES should be chosen to be sufficiently large to ensure a correct solution.

Additionally, a pre-defined percentage P or likelihood that a given set of points N operated on by FIG. 3 and FIG. 4 may be used to filter out geometric primitives (e.g., planes) incorrectly detected as having inliers. For example, the generated refined geometric primitive (e.g., plane) with the lowest error and having a number of liners greater than P*N may be selected.

Exemplary pseudocode for implementing FIG. 3 and FIG. 4 for a plane is provided below in Table 2:

TABLE 2

```
Given a set of points x_i, i = (1,N), and percentage of inlier points P.
for i from 1 to MAX_TRIES do
    Randomly sample 3 non-neighbor points and fit a plane ni,di through
    them using least squares
    for j from 1 to MAX_ITER do
        Compute weights based on the robust M-estimator.
        Fit the new plane ni,j di,j using the weighted least squares
        Compute the new weighted error for all the inlier points
        Exit inner for loop if the error increases
    end for
        Pick the plane with the lowest error if number of inliers is greater
        than P * N
end for
```

However, the methods of FIGS. 1-4 are not limited to being performed to detect anatomical planes, and can be adapted to detect geometric primitives such as various surfaces, points, curves (e.g. lines), and regions of interest (e.g., cuboids). For example, each instance of plane in the pseudocode of Table 2 can be replaced with the corresponding desired primitive (e.g., surface, point, curve, line, cuboid, etc.) and the number of points sampled, could be replaced with the minimum number of points needed to fit the corresponding primitive (e.g., 2 for a line).

The resulting generated anatomical primitives may be used in medical imaging analysis algorithms such as tracking, registration, segmentation, detection, recognition. For example, the methods may be used in the detection of the Mid-Sagittal (MSP), Optical Triangular (OT) planes of brain MR images, intervertebrae-plane detection for 3D spine MR application, detecting a meniscus plane in a knee MR image, etc. Further, the resulting primitives may be used in 3D medical imaging systems (e.g., MR) to speed up imaging workflow. The methods and systems herein disclosed can handle abnormal, irregular, and partial images.

Figure 5:
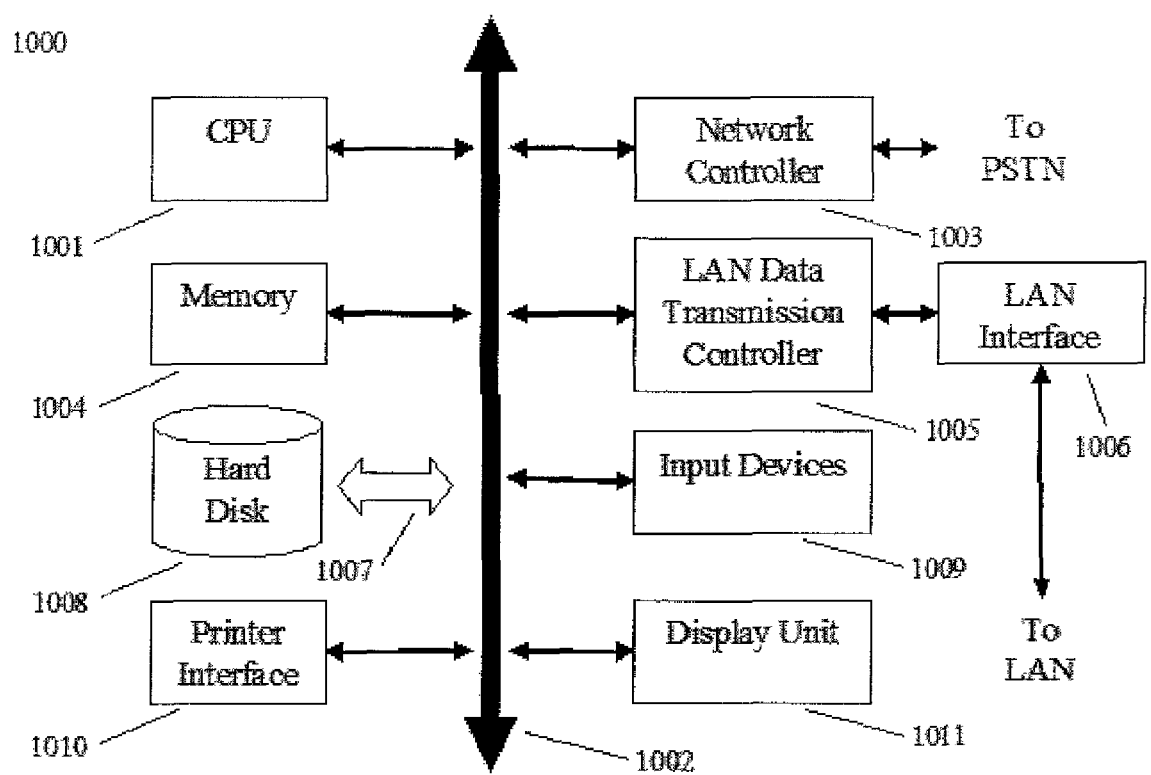
FIG. 5 illustrates an example of a computer system capable of implementing the methods and systems according to embodiments of the present invention.

FIG. 5 shows an example of a computer system, which may implement a method and system of the present disclosure. The system and methods of the present disclosure, or part of the system and methods, may be implemented in the form of a software application running on a computer system, for example, a mainframe, personal computer (PC), handheld computer, server, etc. These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above (e.g., FIG. 1-4).

Embodiments of the present image are not limited to images of any particular format, size, or dimension. For example, the above methods and system may be applied to images of various imaging formats such as magnetic resonance image (MRI), computed tomography (CT), positron emission tomography (PET), etc. The images may be static images such as single dimensional (1D), 2D, 3D, or moving images.

Although illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the disclosure.

What is claimed is:

1. A method of detecting an anatomical primitive in an image volume, the method comprising:
    detecting a plurality of tranformationally invariant points (TIPs) in the volume;
    aligning the volume using the TIPs;
    detecting a plurality of landmark points in the aligned volume that are indicative of a given anatomical object; and
    fitting a target geometric primitive as the anatomical primitive using the detected landmark points, wherein the method is performed by a processor, wherein the fitting comprises:
    for a predetermined plurality of tries, randomly sampling points of the landmark points to fit a geometric primitive using a least squares method;
    refining the geometric primitive and generating a corresponding error using an iteratively re-weighted least squares (IRLS) method; and
    selecting one of the refined geometric primitives as the anatomical primitive based on the corresponding errors.

2. The method of claim 1, wherein the TIPs are rotationally invariant points.

3. The method of claim 1, wherein the aligning comprises aligning the volume based on the TIPs and annotated points within a model patient volume.

4. The method of claim 1, wherein prior to the fitting of the geometric primitive, performing consensus voting on the detected landmark points to discard those it deems erroneous.

5. The method of claim 1, wherein the random sampling comprises sampling a minimum number of the landmark points needed to fit the geometric primitive.

6. The method of claim 4, wherein the consensus voting comprises:
    dividing combinations of the landmark points into voting groups;
    voting by each of the voting groups on landmark points of the other groups based on the degree to which features of the voting group match features of the landmark point voted upon; and
    discarding the landmark points that have a number of votes below a predetermined voting threshold value.

7. The method of claim 1, wherein the selecting of the refined geometric primitive comprises selecting the one that has a lowest error if its number of inlier points is greater than a predefined percentage times the landmark points and the lowest error.

8. The method of claim 7, wherein the predefined percentage indicates a probability that the landmark points are the inlier points.

9. The method of claim 1, wherein the steps before the fitting are iteratively performed for a predetermined number of times.

10. The method of claim 7, wherein the number of inlier points corresponds to the positive weights generated by the IRLS method computing weights of the geometric primitive using an M-estimator method.

11. The method of claim 1, wherein using the IRLS method comprises performing a re-weighted least squares method until the error increases.

12. The method of claim 1, wherein the geometric primitive is one of a point, a curve, a surface, or a three-dimensional region.

13. The method of claim 1, wherein the randomly sampling comprises:
   selecting a reference point from the landmark points;
   randomly sampling three non-neighbor landmark points relative to the reference point; and
   fitting a plane through the sampled points using the least squares method.

14. The method of claim 13, wherein the refining the geometric primitive comprises:
   computing weights for the plane using an M-estimator method;
   refining the plane using the computed weights; and
   computing the error from the refined plane.

15. The method of claim 14, wherein refining plane comprises fitting the plane using a least squares method and the computed weights.

16. The method of claim 1, realized as a computer readable medium embodying instructions executed by a processor to perform the method for detecting an anatomical primitive in an image volume.

17. A method of detecting an anatomical primitive in an image volume, the method comprising:
   detecting a plurality of transformationally invariant landmark points in the image volume that are indicative of a given anatomical object; and
   fitting a target geometric primitive as the anatomical primitive using the detected landmark points, wherein the method is performed by a processor, wherein when the target geometric primitive is a plane, the fitting comprises:
   for a predefined plurality of tries, randomly sampling three of the landmark points and generating a corresponding plane from the sampled points using a least squares method;
   using an iteratively re-weighted least squares (IRLS) method to refine the plane and generate a corresponding error; and
   selecting one of the refined planes as the detected anatomical primitive based on the errors.

18. The method of claim 17, wherein using the IRLS method comprises performing a re-weighted least squares method until the error increases.

19. The method of claim 18, wherein using the IRLS method comprises:
   computing weights for the plane using an M-estimator method, wherein the positive weights correspond to the inlier points;
   generating the refined plane using the computed weights; and
   computing the error from the refined plane.

20. The method of claim 19, wherein generating the refined plane comprises fitting the plane using a least squares method and the computed weights.

21. The method of claim 17, wherein selecting the refined plane comprises selecting the one having a lowest error if a number of its inlier points are greater than a predefined percentage times the number of landmark points.

22. A computer system comprising:
   a processor; and
   a program storage device readable by the computer system, embodying a program of instructions executable by the processor to perform method steps for detecting an anatomical primitive in an image volume, the method comprising:
   detecting a plurality of transformationally invariant points (TIPs) in the volume;
   aligning the volume using the TIPs;
   detecting a plurality landmark points in the aligned volume that are indicative of a given anatomical object;
   for a predefined plurality of tries, randomly sampling points of the remaining landmark points to fit a geometric primitive using a least squares method; and
   refining the geometric primitive and generating a corresponding error using an iteratively re-weighted least squares (IRLS) method; and selecting one of the refined geometric primitives as the anatomical primitive based on the corresponding errors.

* * * * *